(12) United States Patent
Lamerant

(10) Patent No.: US 6,296,818 B2
(45) Date of Patent: Oct. 2, 2001

(54) METHOD FOR PROCESSING BAUXITE RICH IN ALUMINA MONOHYDRATE

(75) Inventor: Jean-Michel Lamerant, Bouc Bel Air (FR)

(73) Assignee: Aluminium Pechiney, Paris (FR)

( * ) Notice: Subject to any disclaimer, the term of this patent is extended or adjusted under 35 U.S.C. 154(b) by 0 days.

(21) Appl. No.: 09/308,244

(22) PCT Filed: Jan. 21, 1998

(86) PCT No.: PCT/FR98/00104

§ 371 Date: Jun. 16, 1999

§ 102(e) Date: Jun. 16, 1999

(87) PCT Pub. No.: WO98/32696

PCT Pub. Date: Jul. 30, 1998

(30) Foreign Application Priority Data

Jan. 22, 1997 (FR) .................................... 97 00850

(51) Int. Cl.$^7$ ....................................................... C01F 7/20
(52) U.S. Cl. ........................... 423/121; 423/122; 423/127
(58) Field of Search .................................... 423/121, 122, 423/127

(56) References Cited

U.S. PATENT DOCUMENTS

| 3,390,959 | * | 7/1968 | Sibert | 23/143 |
| 4,994,244 | * | 2/1991 | Fulford et al. | 423/121 |
| 5,628,972 | * | 5/1997 | Deville et al. | 423/121 |

\* cited by examiner

Primary Examiner—Steven P. Griffin
Assistant Examiner—Christina Ildebrando
(74) Attorney, Agent, or Firm—Dennison, Scheiner, Schultz & Wakeman

(57) ABSTRACT

A process for treating an alumina monohydrate-based bauxite by high temperature caustic digestion includes the steps of introducing alumina trihydrate into the digested slurry at a temperature of less than 200° C., in order to obtain an aluminate liquor at atmospheric pressure having an alumina/caustic weight ratio between 1.20 and 1.30, and diluting the resultant aluminate liquor to result in a caustic concentration between 160 and 175 g $Na_2O$/liter. After settling and filtration, the resulting supersaturated liquor undergoes a further dilution before or during a crystallization step. The alumina trihydrate product is filtered from the spent liquor, which is concentrated and recycled.

11 Claims, 2 Drawing Sheets

METHOD FOR PROCESSING BAUXITE RICH IN ALUMINA MONOHYDRATE

FIELD OF THE INVENTION

This invention relates to the treatment, by alkaline digestion according to the Bayer process, of alumina monohydrate bauxite or boehmite, including the addition of alumina trihydrate or gibbsite.

DESCRIPTION OF RELATED ART

The Bayer process, which is widely described in the literature, constitutes the essential production technique of alumina to be transformed by igneous electrolysis into aluminum, or to be used in the hydrate state or transition, calcinated, sintered or melted alumina states, in numerous applications in the technical alumina field.

According to this process, the bauxite mineral is digested when hot by means of an aqueous liquor of sodium hydroxide at the appropriate concentration, thereby making the alumina soluble and obtaining a slurry made up of particles of non-digested residue (mud) in a sodium aluminate liquor referred to as "aluminate liquor".

This slurry is then usually diluted so as to separate the mud from the aluminate liquor by settling. Once the liquor is "purged" of this mud, it is cooled to a temperature at which it is in a state of strong supersaturation imbalance. At this stage it is referred to as "pregnant liquor". Particles of alumina trihydrate are then seeded in order to initiate the "crystallization" of the pregnant liquor, in other words the precipitation of the alumina in the form of alumina trihydrate. Finally, the sodium aluminate liquor, depleted in alumina as a result of the precipitation and referred to as "spent liquor", is recycled towards the digestion stage after being concentrated by evaporation and, if appropriate, the addition of sodium hydroxide so as to constitute a liquor, known as "digestion liquor", whose concentration is adapted to the digestion of the mineral.

Those skilled in the art are well aware that treatment conditions must be adapted to the degree of hydration and the crystallographic structure of the alumina contained in the bauxite, and to the nature and level of the impurities which it contains.

Bauxite containing alumina in the monohydrate state (boehmite, diaspore) is more difficult to digest than trihydrate bauxite and is treated according to the Bayer process at temperatures higher than 200° C., usually between 220 and 300° C. Bauxite containing alumina in the trihydrate state (gibbsite) is treated at temperatures below 200° C., usually between 100 and 170° C.

The digestion yield is defined by the ratio between the quantity of alumina dissolved in the digestion liquor and the total quantity of alumina contained in the mineral. At the present time, a digestion yield in the region of 90% is usually reached with monohydrate bauxites containing between 2 and 3% of silica.

The chief factors acting on the digestion yield of bauxite are temperature and the concentration of "free" sodium hydroxide or caustic soda, i.e. capable of dissolving alumina. Caustic soda is usually expressed by the base group $Na_2O$ and its concentration given in $Na_2O$ grams per liter (g $Na_2O/l$).

In addition, the saturation or stability state of the liquors is characterized by the weight ratio:

$$A/C = \frac{\text{concentration in dissolved } AL_2O_3 \text{ (in g/l)}}{\text{concentration in } Na_2O \text{ caustic soda (in g/l)}}$$

With regard to bauxites which are rich in monohydrate, the dissolution kinetics falls sharply in the course of dissolution, to such an extent that, in economically viable treatment conditions, the quantity of extracted alumina remains appreciably less than what it could be with the same quantity of caustic soda digesting alumina trihydrate. Thus, the maximum A/C attained with a monohydrate bauxite is of the order of 1.20 while a ratio of 1.40 which can be reached with a trihydrate bauxite.

This A/C weight ratio, characterising the saturation state in alumina dissolved in the liquor of the Bayer cycle, determines the productivity of the liquor during its crystallization. This productivity is defined by the quantity of alumina recovered, in the form of alumina trihydrate, after crystallization of the pregnant liquor, in relation to a given volume of pregnant liquor. The productivity is expressed in kilograms of alumina per cubic meter of liquor (kg $Al_2O_3/m^3$) and is obtained by multiplying the A/C variation before and after crystallization by the caustic concentration of the pregnant liquor. This concentration is usually higher in European-type Bayer processes than in American-type processes and that is the reason why a productivity at the crystallization of the pregnant liquor is considered as good when it exceeds 70 kg $Al_2O_3/m^3$ for an American-type Bayer process and when it exceeds 80 kg $Al_2O_3/m^3$ for an European-type Bayer process.

In the case of monohydrate bauxite, productivity at crystallization could be increased if it were possible to raise the dissolved alumina level and thus the A/C weight ratio, for example by addition of alumina trihydrate and dissolution during the cooling of the liquor, before separation of the red mud. The trihydrate solubility is in fact good up to approximately 100° C. in alkaline medium and such an operation would increase, at least in the first instance, the quantity of alumina dissolved to the extent that the A/C weight ratio could reach 1.25 and even 1.30.

It has occurred that such a mode of liquor supersaturation, developed during the 1950s and referred to as "sweetening", is difficult to exploit on an industrial scale. In point of fact, it is known (YAMADA—Jl of Jap. Inst. of Light Metals—vol. 31 pp. 43–48—January 1981) that in these extreme supersaturation conditions, part of the alumina reprecipitates inopportunely before or during the separation of the red mud and is evacuated with it: this reversion is a particularly unwelcome phenomenon which is to be avoided since it reduces the extraction yield of the alumina.

Thus the sweetening implemented according to American patent U.S. Pat. No. 2,701,752, consisting in adding a certain quantity of trihydrate to the slurry during cooling after the high-temperature digestion of the monohydrate, limits the A/C after digestion to less than 1.08 with caustic concentrations not exceeding 120 g $Na_2O/l$. While the risk of reversion is certainly minimized in these conditions, the productivity of the liquor suffers as a result and does not exceed 70 kg $Al_2O_3/m^3$.

In such conditions, the sole interest of the sweetening mode lies in its ability to reduce the energy cost of the treatment, since it provides a trihydrate digestion which costs nothing in energy terms because it uses the heat supplied for the digestion of the monohydrate.

It therefore emerges clearly that the various means of the prior art, designed to limit the unwelcome effects of reversion on the extraction yield of alumina, are implemented at the expense of the productivity of the liquor which A/C weight ratio can barely exceed 1.15.

Thus alumina producers are still concerned by the development of a an effective process for the treatment of bauxites which are rich in monohydrates, particularly in view of the importance of this type of bauxites as a source of supply. Such a process must satisfy the following criteria:

total alumina digestion yield higher than 90%;

productivity of crystallization greater than 70 kg $Al_2O_3$/ $m^3$ of liquor, being capable of exceeding 90 kg $Al_2O_3$/ $m^3$ in a European-type Bayer process;

reduction of the quantity of energy required to dissolve the same quantity of alumina.

SUMMARY OF THE INVENTION

The process according to the invention developed by the applicant satisfies these criteria. For this purpose, a sweetening stage is included in the process but is implemented in an entirely different way.

More specifically, the invention relates to a process for treating alumina monohydrate-based bauxite by caustic and high-temperature digestion of the ground bauxite so as to form a slurry which is settled and filtered in order to separate a sodium aluminate liquor to be crystallized in the presence of seeds and an insoluble residue, the process being characterized by the following series of operations:

a) digesting the bauxite, preferably ground, at a temperature higher than 200° C., with shaking if required, with a liquor which caustic concentration is above or equal to 160 g Na2O/liter and having an A/C weight ratio between 0.45 and 0.75, for a contact time which is sufficient to extract the aluminate monohydrate and to give an A/C ratio between 1.10 and 1.20;

b) cooling and flashing the resulting slurry, then introducing alumina trihydrate in said slurry, at a temperature of less than 200° C., in order to obtain an A/C ratio of the aluminate liquor between 1.20 and 1.30 when at atmospheric pressure, the temperature being slightly below boiling temperature;

c) first diluting the slurry giving a caustic concentration between 160 and 175 g Na2O/liter;

d) settling of said slurry, preferably in the presence of a flocculant, in order to separate the insoluble residue from a sodium aluminate liquor having an A/C ratio between 1.20 and 1.30;

e) filtering the aluminate liquor;

f) lowering the aluminate liquor concentration to less than 160 g Na2O/liter, via a complementary dilution carried out before or during crystallization, in which the alumina trihydrate precipitates, one part being recycled as seed and the other part being filtered and then washed;

g) after separation of the alumina trihydrate by filtration, recycling of the spent liquor which, after concentration, for example by evaporation and possible addition of sodium hydroxide, is reused as digestion liquor with a caustic concentration above or equal to 160 g Na2O/ liter.

Preferably, the alumina trihydrate in stage b) is introduced by injecting a pulp obtained by grinding, in the presence of an aliquot of the digestion liquor, an alumina trihydrate bauxite or waste containing the same.

Also preferably, the complementary dilution of the liquor, which is carried out according to the invention after the settling stage, is performed with a previously filtered fraction of a diluted liquor resulting from the washing of the red mud, possibly containing the wash water of the alumina trihydrate produced. This takes place before or during crystallization and it is important to take steps to avoid any pollution by this wash water, for example by means of a preliminary filtration. The liquor may for example be diluted, filtered and then introduced in the chain of precipitators.

Contrary to all expectations, the applicant observed that it was able to delay, at least partially, the dilution of the aluminate liquor until the start of its crystallization. This operating method, however, runs counter to the usual practice in which the specialist dilutes the slurry by adding water so as to facilitate the settling of the mud. This dilution has the twin advantage of reducing its viscosity and allowing the addition of numerous flocculants which are unstable in liquors which are too concentrated. On the other hand, it increases alumina supersaturation which favors reversion. But the precipitation kinetics are slow when the A/C does not exceed 1.10–1.15 or even 1.20, so that this risk has always been considered as minimal provided that settling times are not too long. If settling is too lengthy, the fine particles of the non-digested residue present in the slurry may in fact initiate the precipitation and an intense reversion may still develop 5 or 6 hours after the start of settling. Dilution before separation of the mud has consequently always been considered as obligatory by the specialist because it shortens settling time and preserves the stability of the flocculants.

It unexpectedly occurred to the applicant that, given the flocculants currently used—these are usually anionic polyelectrolytes, for example synthetic polyacrylates which may advantageously be combined with polysaccharide-based additive improving clarity—, it was possible to settle the insolubles in a concentrated aluminate liquor in an acceptable lapse of time, despite a very high A/C, higher than 1.20, without reversion occurring. It emerges that the delaying effect of the reversion due to the high caustic level prevails over the accelerating effect due to a slight increase in the settling time. Moreover, the strong aluminate concentration appreciably increases its boiling temperature, thereby making it possible to settle at a higher temperature and to reduce still further the risk of reversion.

In other words, despite a very high A/C, higher than 1.20, obtained by sweetening, the risk of reversion of the pregnant liquor during the separation of the insolubles is considerably reduced when the caustic concentration remains above or equal to 160 g $Na_2O$/l, due to the partial transfer of the dilution until after the settling stage.

What matters here, in fact, is that part of the dilution has been postponed until after the settling. This complementary dilution of the aluminate liquor may be carried out at once, right at the start of crystallization. This simple procedure was chosen in our examples. But, with a view to further improving productivity, the crystallization chain may be arranged in such a way that dilution is carried out in several stages during crystallization. It is known (J. V. Sang et al. Light Metals 1989, pp. 33–39, FIG. 1) that the optimum caustic concentration with respect to productivity diminishes as the A/C falls. Since the A/C inevitably falls during crystallization, it is important to dilute gradually the liquor of the aluminate slurry circulating in the crystallization chain so that productivity remains constantly at an optimum level.

BRIEF DESCRIPTION OF THE DRAWINGS

A clearer understanding of the invention will emerge from the detailed description of its application based on the following figures.

DESCRIPTION OF THE PREFERRED EMBODIMENTS

Figure 1:
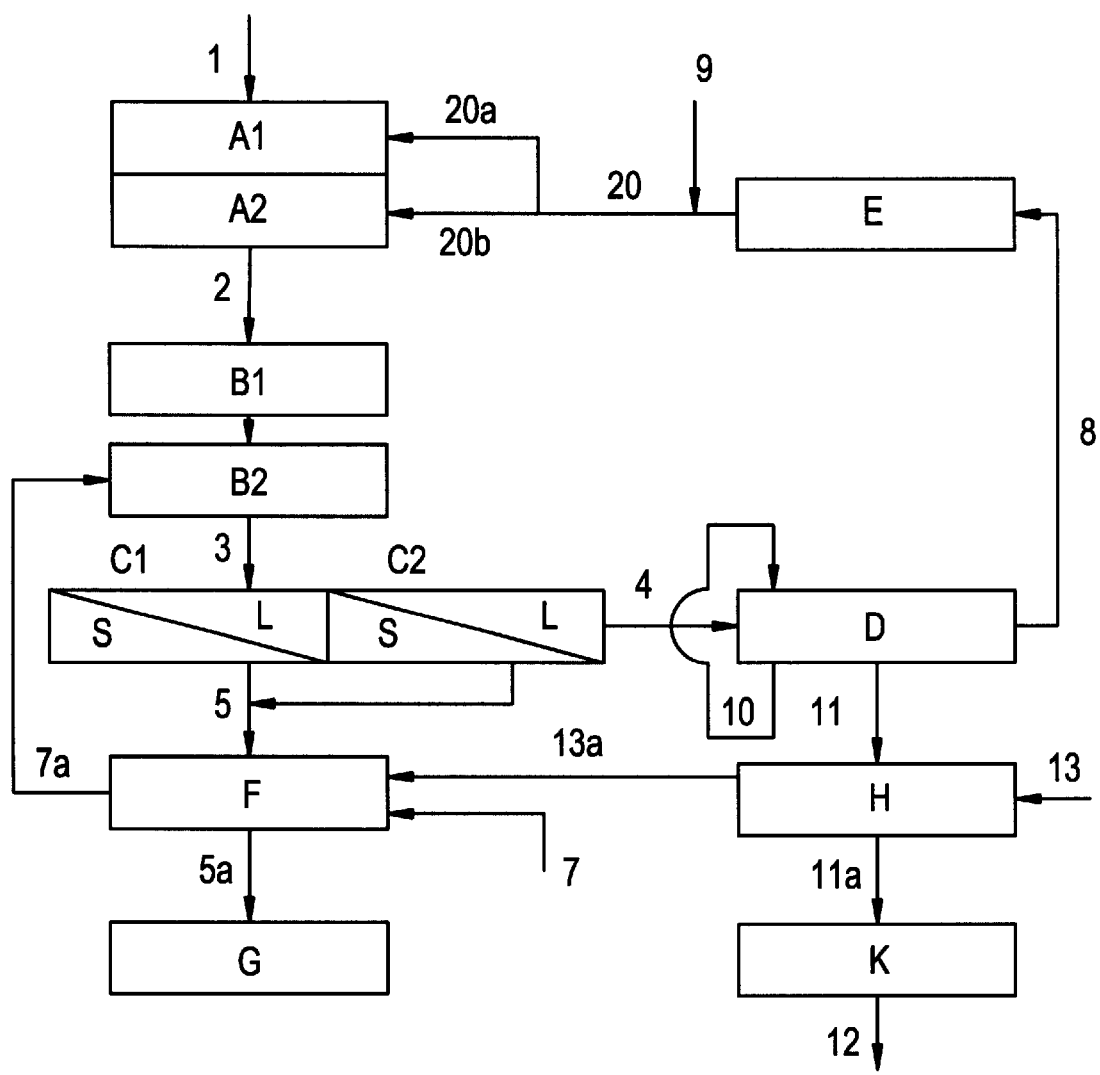
FIG. 1 representing in diagram form the product flows in a digestion process according to the prior art FIG. 2 representing in diagram form the product flows in the basic process according to the invention

According to FIG. 1, representative of the prior art, the monohydrate bauxite 1 is submitted to a humid grinding A1 in the presence of an aliquot 20a of digestion liquor 20 having an A/C ratio preferably between 0.5 and 0.7 and a caustic concentration between 160 and 220 g $Na_2O$/l. The whole is introduced, with the other aliquot 20b of the digestion liquor 20, in autoclaves so as to form a slurry which is heated to a temperature between 220 and 300° C. for a sufficient length of time, generally between 0.2 and 1 hour, in order to extract the alumina monohydrate. The slurry 2 resulting from this pressurized digestion A2 is cooled and put to atmospheric pressure (Cooling/Flash B1), then diluted (Dilution B2). The caustic concentration after said dilution is less than 160 g $Na_2O$/l, preferably between 140 and 150 g $Na_2O$/l. The resulting slurry 3 is then settled C1 in the presence of a flocculant and then to filtration C2 in order to separate the insoluble residues 5 from the aluminate liquor 4. After washing F with the water 7 and the wash water 13a resulting from the crystallization, the inert residues 5a, or mud, are evacuated for discharge G and the wash water 7a is used for dilution B2 of the slurry 3 before settling C1.

The aluminate liquor 4, having an A/C ratio between 1.05 and 1.15 and a caustic concentration between 110 and 160 g $Na_2O$/l, is then cooled and crystallized between 80° C. and 50° C. (crystallization D) in the presence of fine particles of precipitate 10 recycled to act as seed. The grains of alumina trihydrate thus obtained are classified in such a way that the largest 11 are recovered, and after washing H with water 13, calcinated (calcination K) in order to produce the production alumina 12, while the finest 10 remain within the recycled seeds. The spent liquor 8, with an A/C ratio between 0.5 and 0.7, is then reconcentrated by evaporation E with a possible addition of sodium hydroxide 9 and becomes the digestion liquor 20.

Figure 2:
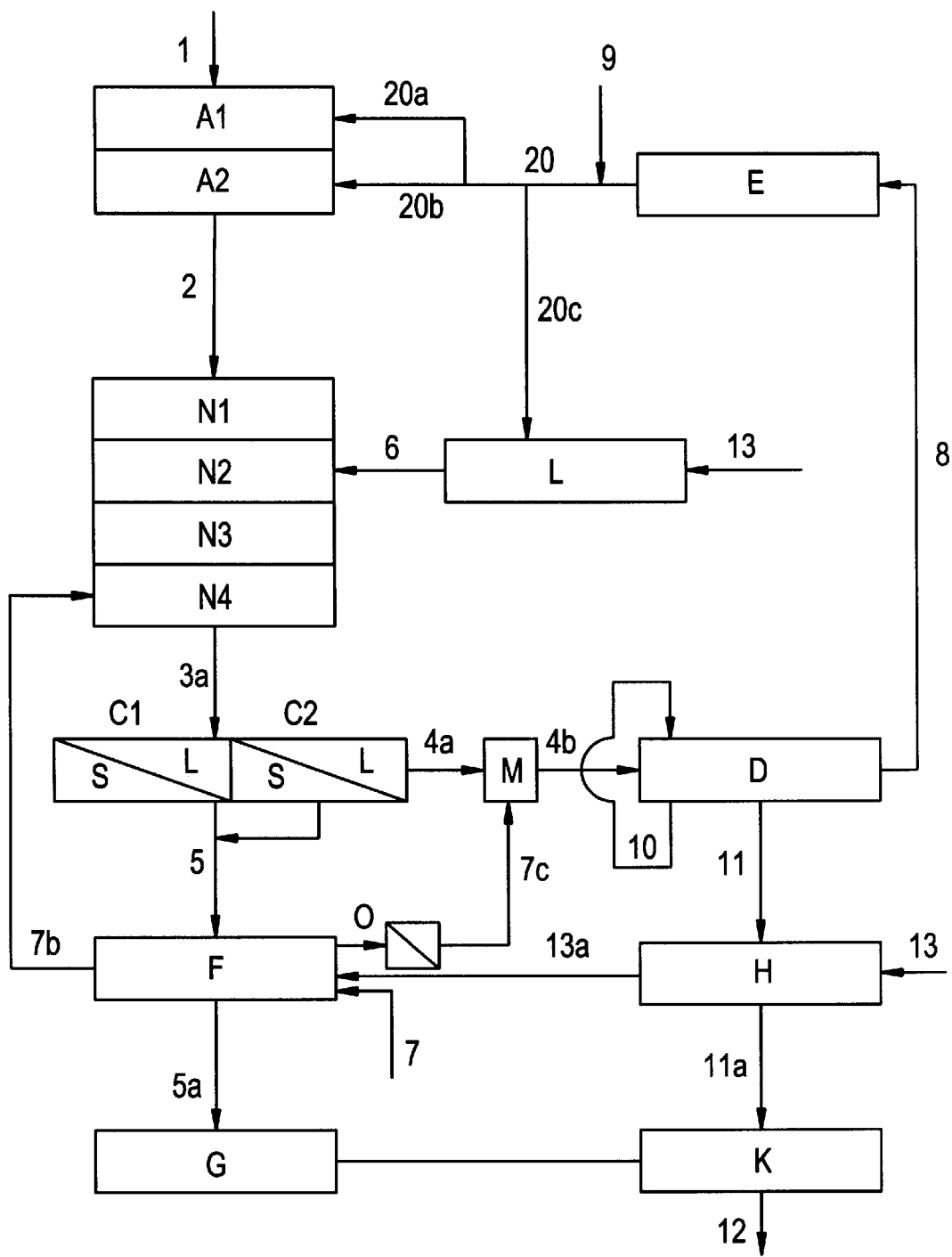

The basic procedure according to the invention illustrated in diagram form in FIG. 2 is implemented as follows:

The same monohydrate bauxite 1, after a first humid grinding A1 in the presence of an aliquot 20a of digestion liquor 20 having an A/C ratio preferably between 0.55 and 0.65 and a caustic concentration between 160 and 220 g $Na_2O$/l, is introduced with another aliquot 20b of the digestion liquor 20, in autoclaves so as to form a slurry which is heated to a temperature between 220 and 300° C. for a sufficient length of time to extract the alumina monohydrate, between 0.2 and 1 hour. The slurry 2 resulting from this first pressurized digestion A2, with A/C between 1.05 and 1.20, is partially cooled and flashed (Cooling/Flashing N1). At a temperature of less than 200° C., a pulp 6 containing alumina trihydrate, resulting from the humid grinding L of trihydrate bauxite 13 with a third aliquot 20c of the digestion liquor 20, is injected under pressure ("Sweetening" N2). Before being injected in the slurry 2, the ground pulp 6 is maintained for a dwell time of between 3 and 24 hours so as to produce a predesilicatation of said pulp.

The injection preferably takes place between 190 and 130° C. in the flash tank corresponding to this temperature and ensuring a dwell time of at least two minutes. The slurry 3a, enriched in alumina as a result of the injection of the ground pulp 6, is then cooled and flashed to atmospheric pressure. It has an A/C ratio between 1.20 and 1.28 and its caustic concentration is between 180 and 220 g $Na_2O$/l. It is submitted to a first dilution by addition of a fraction 7b of diluted liquor resulting from washing of the mud. Its concentration is lowered to a value between 160 and 175 g $Na_2O$/l. It is then submitted, at a temperature slightly below—at most 5° C. below—boiling temperature, to settling C1 in the presence of a flocculant, and lastly to filtration C2 in order to separate the sodium aluminate liquor 4a from the insoluble residues 5. After countercurrent washing by the water 7 and the wash water 13a of the alumina trihydrate produced 11, these inert residues 5a, or mud, are discharged G.

The aluminate liquor 4a is diluted (dilution M) with the filtered wash water 7c (filtration O) of the residues 5. The diluted liquor 4b has a caustic concentration between 140 and 155 g $Na_2O$/l. It is then cooled and crystallized (D) between 80° C. and 50° C. in the presence of fine particles of precipitate 10 serving as seed. The grains of alumina trihydrate thus obtained are classified in such a way that the largest 11 are recovered. The grains just washed 11a are calcined K to supply the production alumina 12, while the finest remain within the recycled seeds 10. The spent liquor 8 is then reconcentrated by evaporation and possible addition of sodium hydroxide so as to reach a caustic concentration between 160 and 220 g $Na_2O$/l. Once concentrated, the liquor is used as digestion liquor 20.

EXAMPLES OF APPLICATION

In examples 1 (according to the prior art), 2 and 3 (according to the invention), a first monohydrate bauxite (diaspore) was digested according to an European-type Bayer process. In example 4, a monohydrate Australian bauxite (boehmite) was digested according to an American-type Bayer process.

The dry ponderal composition of the first bauxite is as follows:

| element | % in weight |
| --- | --- |
| $Al_2O_3$ | 56.77 |
| $Fe_2O_3$ | 21.58 |
| total SiO2 | 2.63 |
| TiO2 | 2.69 |
| Ignition loss and various | 16.33 |

Example 1

According to the prior art, a 100 ton batch of said bauxite was digested at 260° C. for 1 hour with a digestion liquor concentrated at 210 g $Na_2O$/l.

After flash, cooling, dilution and settling, we obtained the following results:

Liquor before crystallization
  A/C: 1.15
  Caustic concentration: 146 g $Na_2O$/l
Liquor after crystallization
  A/C: 0.58
Global digestion yield: 90.6% extracted alumina/total alumina
Productivity at crystallization: 83 Kg $Al_2O_3$/m³

Energy necessary for the digestion of 1 kg of alumina: 3.55 MJ

Example 2

Another 100 ton batch of the same bauxite was digested according to a first mode of the invention:

Digestion at 260° C. for 1 hour with a digestion liquor concentrated at 210 g $Na_2O/l$.

Cooling to 160° C.

The slurry being maintained shaken, 9.2 tons of an African bauxite rich in trihydrate (85%) was injected in slurry form, said bauxite having previously been ground in the presence of an aliquot of the digestion liquor.

The trihydrate bauxite has the following ponderal composition:

| element | % in weight |
| --- | --- |
| $Al_2O_3$ | 56.5 |
| $Fe_2O_3$ | 4.8 |
| total SiO2 | 1.4 |
| TiO2 | 3.7 |
| Ignition loss and various | 33.6 |

This slurry is mixed with the principal slurry and the digestion is maintained for 5 minutes. the quantity of alumina dissolved is such that the A/C weight ratio of the pregnant liquor reaches 1.25.

After flash, a first dilution was carried out, leading to a concentration of 168 g $Na_2O/l$, then a settling at 104° C., in the presence of flocculant CYTEC® HX 400, at the rate of 600 g/ton of insoluble residue. After separation of the insoluble residues, the aluminate liquor was again diluted to a concentration of 147 g $Na_2O/l$.

After dilution, we obtained the following results:

Liquor before crystallization
A/C: 1.21

Liquor after crystallization
A/C: 0.585

Global digestion yield: 91.0% extracted alumina/total alumina

Productivity at crystallization: 91.5 kg $Al_2O_3/m^3$

Energy necessary for the digestion of 1 kg of alumina: 3.25 MJ

Example 3

Another 100 ton batch of the same bauxite was digested according to a second mode of the invention:

Digestion at 260° C. for 1 hour with a digestion liquor concentrated at 210 g $Na_2O/l$.

Cooling to 130° C.

The slurry being maintained shaken, 13 tons of a Brazilian bauxite rich in trihydrate was injected in slurry form, said bauxite having previously been ground in the presence of an aliquot of the digestion liquor. The quantity of alumina dissolved is such that the A/C weight ratio of the aluminate liquor reaches 1.27/1.28.

After expansion and first dilution at 175 g $Na_2O/l$, settling took place at 108° C., in the presence of flocculant CYTEC® HX 400, at the rate of 800 g/ton of insoluble residue. After separation of the residue, the liquor is diluted to a concentration of 146 g $Na_2O/l$.

After dilution, we obtained the following results:

Pregnant liquor before crystallization
A/C: 1.23

Pregnant liquor after crystallization
A/C: 0.59

Global digestion yield: 91.31 extracted alumina/total alumina

Productivity at crystallization: 93 kg $Al_2O_3/m^3$

Energy necessary for the digestion of 1 kg of alumina: 3.15 MJ

Example 4

Sweetening and Partial Transfer of Dilution on an American-type Bayer Process

In this example, an Australian monohydrate bauxite (boehmite) having the following dry ponderal composition was digested:

| element | % in weight |
| --- | --- |
| $Al_2O_3$ | 54.22 |
| $Fe_2O_3$ | 12.01 |
| total SiO2 | 5.6 |
| TiO2 | 2.83 |
| Ignition loss and various | 25.34 |

A batch of 100 tons of this Australian monohydrate bauxite was digested according to a third mode of the invention:

Digestion at 265° C. for 20 minutes with a digestion liquor concentrated at 180 g $Na_2O/l$.

After partial flashing, a slurry containing 11 tons of African bauxite rich in trihydrate was injected in the slurry cooled to 180° C., said bauxite having previously been ground in a minimum of digestion liquor followed by desilicatation for 8 hours at 100° C. The quantity of alumina dissolved is such that the A/C weight ratio of the aluminate liquor reaches 1.23.

A first dilution at 160° C. $Na_2O/l$ is carried out before settling at 103° C. in the presence of flocculant CYTEC® HX 400, at the rate of 500 g/ton of insoluble residue, and then the liquor is diluted to a concentration of 130 g $Na_2O/l$.

After dilution, we obtained the following results:

Liquor before crystallization
A/C: 1.20

Liquor after crystallization
A/C: 0.63

Global digestion yield: 88.4% extracted alumina/total alumina

Productivity at crystallization: 74 kg $Al_2O_3/m^3$

Energy necessary for the digestion of 1 kg of alumina: 3.35 MJ

What is claimed is:

1. Process for treating an alumina monohydrate-based bauxite, comprising the steps of:

a) digesting the bauxite at a temperature higher than 200° C. by contact with a liquor having a caustic concentration of at least 160 g $Na_2O$/liter and an alumina/caustic weight ratio between 0.45 and 0.75, for a contact time sufficient to extract aluminate monohydrate from the bauxite and result in a slurry having an alumina/caustic weight ratio of between 1.10 and 1.20;

b) cooling and flashing the slurry with introduction of alumina trihydrate therein, at a temperature of less than 200° C., in order to obtain an aluminate liquor at atmospheric pressure having an alumina/caustic weight ratio between 1.20 and 1.30;

c) diluting the aluminate liquor at atmospheric pressure to result in a caustic concentration between 160 and 175 g $Na_2O$/liter;

d) settling said diluted liquor to separate an insoluble residue from an aluminate liquor having an alumina/caustic weight ratio between 1.20 and 1.30, e) filtering the settled aluminate liquor to form a supersaturated liquor;

f) crystallizing alumina trihydrate from the supersaturated liquor, with lowering of the caustic concentration in the supersaturated liquor to less than 160 g $Na_2O$/liter, via a complementary dilution carried out before or during said crystallization; and g) separating the crystallized alumina trihydrate from the liquor by filtration to produce a spent liquor, then concentrating the spent liquor to a caustic concentration of at least 160 g $Na_2O$/liter and recycling the spent liquor to said digesting step.

2. Process according to claim 1, wherein the caustic concentration of the digestion liquor is between 160 and 220 g $Na_2O$/l.

3. Process according to claim 1, wherein the digesting is carried out at a temperature of between 220° C. and 300° C. for 0.2 to 1 hour.

4. Process according claim 1, wherein the introducing of alumina trihydrate in step b) is carried out by injection of a pulp obtained by grinding, in the presence of an aliquot of the digestion liquor, an alumina trihydrate bauxite or a waste containing same.

5. Process according claim 1, wherein the introducing of alumina trihydrate in step b) takes place at a temperature of between 130° C. and 190° C. in the slurry for at least two minutes.

6. Process according to claim 1, wherein the settling takes place in the presence of a synthetic polyacrylate flocculant at a temperature at least equal to boiling temperature of the diluted liquor minus 5° C.

7. Process according to claim 1, wherein the supersaturated sodium aluminate liquor has an alumina/caustic weight ratio between 1.20 and 1.28.

8. Process according to claim 1, additionally comprising the steps of washing an insoluble residue with a wash liquor, filtering the wash liquor after said washing, and carrying out the complementary dilution of the supersaturated liquor using said filtered wash liquor, optionally containing wash water from washing the alumina trihydrate produced.

9. Process according to claim 1, wherein the supersaturated liquor is diluted to a caustic concentration between 140 and 155 g $Na_2O$/l, then crystallized at a temperature between 80° and 50° C.

10. Process according to claim 1, wherein the liquor after said crystallizing has an alumina/caustic weight ratio between 0.55 and 0.65.

11. Process according to claim 1, wherein said complementary dilution comprises more than one dilution carried out during said crystallization.

* * * * *